(12) United States Patent
Olsen et al.

(10) Patent No.: US 12,417,548 B2
(45) Date of Patent: Sep. 16, 2025

(54) SCANNING DEVICE

(71) Applicant: Global Scanning Denmark A/S, Allerød (DK)

(72) Inventors: Bo Kjær Olsen, Allerød (DK); Søren Thuun Jensen, Allerød (DK); Nis Engholm, Allerød (DK)

(73) Assignee: Global Scanning Denmark A/S, Allerød (DK)

( * ) Notice: Subject to any disclaimer, the term of this patent is extended or adjusted under 35 U.S.C. 154(b) by 0 days.

(21) Appl. No.: 18/639,747

(22) Filed: Apr. 18, 2024

(65) Prior Publication Data

US 2024/0362806 A1    Oct. 31, 2024

(30) Foreign Application Priority Data

Apr. 26, 2023  (EP) ..................................... 23169985

(51) Int. Cl.
*G06T 7/521*  (2017.01)
*G06T 7/73*  (2017.01)
*G06T 7/80*  (2017.01)

(52) U.S. Cl.
CPC ................ *G06T 7/521* (2017.01); *G06T 7/74* (2017.01); *G06T 7/80* (2017.01); *G06T 2207/10024* (2013.01)

(58) Field of Classification Search
CPC .. G06T 7/521; G06T 7/80; G06T 7/74; G06T 2207/10024; H04N 1/193; H04N 1/195; H04N 1/204

(Continued)

(56) References Cited

U.S. PATENT DOCUMENTS 9,473,665 B1 * 10/2016 Fu .............................. H04N 1/04
10,788,735 B2 * 9/2020 Lipik .................... G03B 17/561

(Continued)

OTHER PUBLICATIONS

European Search Report for EP 23169985 dated Oct. 10, 2023.

*Primary Examiner* — Joseph G Ustaris
(74) *Attorney, Agent, or Firm* — Knobbe Martens Olson & Bear LLP

(57) ABSTRACT

Disclosed is a method and a scanning device for digital image scanning of a surface of an object. The scanning device comprising a light source for illuminating the object. The scanning device comprising a first image sensor configured for capturing a first set of images of a first region of the object, where the first region is illuminated by the light source. The scanning device comprising a second image sensor configured for capturing a second set of images of a second region of the object, where the second region is illuminated by the light source. The scanning device comprising a laser component configured for projecting laser light onto the object. The projected laser light has a shape of a cross on the object. The first image sensor and the second image sensor are configured to capture/cover an overlapping region on the object. The overlapping region comprising a part of the first region of the object and a part of the second region of the object. The laser light from the laser component is configured to be projected onto the overlapping region. The first image sensor and the second image sensor are configured for capturing a third set of images and a fourth set of images, respectively, of the object including the projected laser light on the overlapping region.

14 Claims, 10 Drawing Sheets

(58) Field of Classification Search
USPC .......................................................... 348/136
See application file for complete search history.

(56) References Cited

U.S. PATENT DOCUMENTS

| | | |
|---|---|---|
| 2009/0180085 A1 | 7/2009 | Rieck et al. |
| 2014/0036323 A1* | 2/2014 | Kaempflein ......... H04N 1/4092 |
| | | 358/482 |
| 2021/0348914 A1* | 11/2021 | Scarfe ....................... G06T 7/62 |
| 2022/0182556 A1* | 6/2022 | Pilloud ................. H01S 3/0071 |

* cited by examiner

✱ Detection of laser light on image sensor lines/channels

✱ Detection of laser light on image sensor lines/channels in distance n from camera to object 🌸 Detection of laser light on image sensor lines/channels in distance n from camera to object ⬤ Detection of laser light on image sensor lines/channels in distance n-2 from camera to object Detection of laser light on image sensor lines/channels in distance n from camera to object after camera bar has been elevated

SCANNING DEVICE

CROSS REFERENCE TO RELATED APPLICATIONS

This application claims the benefit of priority to European Patent Application No. 23169985.1, filed on Apr. 26, 2023. The disclosure of the above-referenced application is hereby expressly incorporated by reference in its entirety.

FIELD

The present invention relates to scanning devices. More specifically, the disclosure relates to a scanning device for digital image scanning of a surface of an object. The scanning device comprising a light source for illuminating the object. The scanning device comprising a first image sensor configured for capturing a first set of images of a first region of the object, where the first region is illuminated by the light source. The scanning device comprising a second image sensor configured for capturing a second set of images of a second region of the object, where the second region is illuminated by the light source.

BACKGROUND

Scanning of large objects, e.g. large maps, artpieces or technical drawings, is conventionally performed by use of a plurality of scanner cameras as it is difficult and expensive to manufacture image sensors with dimensions sufficiently wide to cover a large document such as an A2 format, A1 format or A0 format. Examples of image sensors are charge coupled devices (CCD) or contact image sensors (CIS). The image sensors are typically arranged on a movable fixture, moving past the object to be scanned, or the object is pulled past a fixture by means of motor-operated rolls.

However, since a plurality of image sensors is used in a scanner to scan such large objects, there may be different problems with alignment of the image sensors; with adjustment of focus; and with scaling, matching and stitching of the images from the different image sensors.

Thus, there is a need for an improved scanning device.

SUMMARY

Disclosed is a scanning device for digital image scanning of a surface of an object. The scanning device comprising a light source for illuminating the object. The scanning device comprising a first image sensor configured for capturing a first set of images of a first region of the object, where the first region is illuminated by the light source. The scanning device comprising a second image sensor configured for capturing a second set of images of a second region of the object, where the second region is illuminated by the light source. The scanning device comprising a laser component configured for projecting laser light onto the object. The projected laser light has a shape of a cross on the object. The first image sensor and the second image sensor are configured to capture/cover an overlapping region on the object. The overlapping region comprising a part of the first region of the object and a part of the second region of the object. The laser light from the laser component is configured to be projected onto the overlapping region. The first image sensor and the second image sensor are configured for capturing a third set of images and a fourth set of images, respectively, of the object including the projected laser light on the overlapping region.

The scanning device is configured for digital image scanning of a surface of an object. The scanning device may be a scanner, such as a two-dimensional (2D) scanner, a light scanner, a flat-bed scanner, a non-touch scanner, a touch-free scanner, a large format scanner etc. The scanning device may perform line scanning of the object, i.e. scanning multiple lines of the object and collecting them into a completed scan. The scanning may be performed as 2D scanning, e.g. surface scanning. The scanning may be performed using light. The scanning may be an optical scanning.

The scanning is of the surface of the object, thus in general when the "object" is mentioned in this text, it can be assumed that the "surface of the object" is meant. The object may have more surfaces, thus it is the surface of object which is pointing towards the image sensor, which is scanned. The object may be substantially flat, such as suitable for being placed in the type of scanner, and/or the object may be slightly curved.

The object may be an original to be scanned. The original may be a physical document, such as an artpiece, a map, a technical drawing, a sheet of paper, a book, a painting, a sheet of fabrics, a textile, canvas, etc. The result of scanning an object may be a digital image of the object, and the digital image may be denoted the reproduction or the reproduced document.

The object may be a calibration sheet for calibration of the scanning device before scanning the original.

The object may be a so-called large object, and scanning of large objects, e.g. large maps, artpieces or technical drawings, is conventionally performed by use of a plurality of scanner cameras or image sensors as it is difficult and expensive to manufacture image sensors with dimensions sufficiently wide to cover a large document such as an A2 format, A1 format or A0 format. Examples of image sensors are charge coupled devices (CCD) or contact image sensors (CIS). The image sensors are typically arranged on a movable fixture, moving past the object to be scanned, or the object is pulled past a fixture by means of motor-operated rolls.

The scanning device may comprise a horizontally arranged plate for supporting the object which can be laid on the plate and face upwards. Above the plate, a longitudinal scan bar may extend across the full width of the plate and may carry an optical system, comprising line scanning image sensors or cameras, for performing line scanning, as well as comprising the light source(s). The scan bar may also comprise rollers to support the plate. The plate supporting the object may be configured to move in a direction, e.g. in a transverse direction, to the orientation of the longitudinal scan bar. While the plate supporting the object moves, an electronic circuit acquires line image data from the line scanning cameras to produce a digital image of the object. Thereby the object is scanned line-by-line.

The scanning device comprises a light source for illuminating the object. The light source may comprise one or more separate light sources, such as one or more lamps. The light source may comprise two lamps. The light source may comprise a linear light source. The light source may comprise two linear light sources. The light source may extend across a part of or across the entire x-direction of the scanner. The light source may comprise a rear focused linear light source and/or a front focused linear light source. The light source may transmit white light.

The scanning device comprises a first image sensor configured for capturing a first set of images of a first region of the object, where the first region is illuminated by the light source. The first image sensor may be a camera, a red-green-blue (RGB) image sensor or camera, a CCD camera, a CMOS camera etc. Thus when a region, e.g. the first region, of the object is illuminated by the light source, the first image sensor may capture a first set of images of that region, e.g. the first region.

The scanning device comprises a second image sensor configured for capturing a second set of images of a second region of the object, where the second region is illuminated by the light source. The second image sensor may be a camera, a red-green-blue (RGB) image sensor or camera, a CCD camera, a CMOS camera etc. Thus when a region, e.g. the second region, of the object is illuminated by the light source, the second image sensor may capture a second set of images of that region, e.g. the second region.

The first image sensor and the second image sensor may be similar image sensors. The first image sensor and the second image sensor may be arranged next to each other in a scan bar. The first image sensor and the second image sensor may be arranged next to each other in the x-direction. The first image sensor and the second image sensor are configured for capturing the first set of images and the second set of images at the same time, such as substantially the same time, such that the first region and the second region of the object is captured at the same time, for each line.

The first and second image sensors and the light source may be arranged in a scan bar which moves across the object, and an electronic circuit may acquires line image data from the image sensors to produce a digital image of the object. Thereby the object is scanned line-by-line. Thus a new region of the object is captured in the next line. The object may be scanned in the y-direction.

The scanning device may comprise more than two image sensors. The scanning device may comprise a third image sensor, a fourth image sensor, a fifth image sensor, a sixth image sensor etc. The image sensors may be similar image sensors. The third image sensor may capture a set of images of a third region of the object. The fourth image sensor may capture a set of images of a fourth region of the object. The fifth image sensor may capture a set of images of a fifth region of the object. The sixth image sensor may capture a set of images of a sixth region of the object. The image sensors may be arranged next to each other in a scan bar. The image sensors may be arranged next to each other in the x-direction. The image sensors are configured for capturing their sets of images at the same time, such as substantially the same time, such that the first, second, third, fourth, fifth, sixth etc. regions of the object are captured at the same time, for each line. Thus the scanning device may comprise a plurality of image sensors or scanner cameras e.g. line arrays.

The scanning device comprises a laser component configured for projecting laser light onto the object. The laser component may be a laser, a laser device, a solid-state laser. The laser component may have a wavelength between 400 nm-700 nm, such as between 450 nm-625 nm, such as between 475 nm-525 nm, such as between 500 nm-520 nm, such as about 514 nm, or such as between 500 nm-625 nm, such as between 550 nm-600 nm, such as about 575 nm. The color of the laser light may be blue-green, e.g. when the wavelength is about 514 nm. The color of the laser light may be yellow-green, e.g. when the wavelength is about 575 nm.

The laser component may be arranged between the first and the second image sensor. The laser component may comprise more than one laser component, such as a first laser component, a second laser component, a third laser component, a fourth laser component, a fifth laser component etc. The first laser component may be arranged between the first and the second image sensor. The second laser component may be arranged between the second and the third image sensor. The third laser component may be arranged between the third and the fourth image sensor. The fourth laser component may be arranged between the fourth and the fifth image sensor. The fifth laser component may be arranged between the fifth and the sixth image sensor. Thus there may be five laser components and six image sensors.

The projected laser light has a shape of a cross on the object. The laser light may comprise a beam of light. The laser component may comprise one laser projecting the light in the shape of a cross, or the laser component may comprise two lasers, where each laser projects the light in the shape of a line ("/"), and where the two lines of laser light intersects to form a cross ("x") on the object. The angles between of the lines of the cross may be substantially equal, such as about 90 degrees. The entire cross ("x") may be used, or half the cross may be used. Half of the cross may be a "v" shape in any direction, such as "v", "A", ">", "<" etc. The cross may be turned relative to the scanning line or scan direction, such as turned relative to a vertical line. Thus, the cross may be turned so that the lines of the cross are in a 45 degrees angle compared to the scanning line/scan direction.

The first image sensor and the second image sensor are configured to cover an overlapping region on the object. The overlapping region comprises a part of the first region of the object and a part of the second region of the object. Thus, both the first image sensor and the second image sensor are configured to capture images of the overlapping region of the object. Thus, the first set of images, captured by the first image sensor, and the second set of images, captured by the second image sensor, includes the overlapping region. As the scan bar with the image sensors, the light source(s) and the laser component(s) moves across the object, the overlapping region "moves" as well.

The laser light from the laser component is configured to be projected onto the overlapping region. Thus, the overlapping region comprises the projected laser light cross, when the laser component is turned on.

The laser component and the light source are configured to be turned on at different times, such as alternately, in a shifting manner, in a switching manner etc. When the laser component is on, the light source is configured to be off. When the light source is on, the laser component is configured to be off. The laser component is configured to be off when the light source is on. The light source is configured to be off when the laser component is on. The laser component and the light source are not configured to be on at the same time.

The first image sensor and the second image sensor are configured for capturing a third set of images and a fourth set of images, respectively, of the object including the projected laser light on the overlapping region. Thus the first image sensor is configured for capturing a third set of images of the object where the laser light from the laser component is projected onto the overlapping region. At the same time, the second image sensor is configured for capturing a fourth set of images of the object where the laser light from the laser component is projected onto the overlapping region.

Thus, the third set of images and the fourth set of images both comprise the overlapping region where the laser light can be seen on the object.

The third and fourth set of images are not captured at the same time as the first and second set of images, because the light source and laser light are not used, e.g. on, at the same time, but alternately. The third and fourth set of images may be captured a few seconds, such as 1, 2, 3, 4, 5, 6, 7, 8, 9 or 10 seconds, later than the first and second set of images.

The first and third set of images captured by the first image sensor may be of the same first region of the object. The second and fourth images captured by the second image sensor may be of the same second region of the object.

The naming "first", "second", "third", and "fourth" images does not necessarily refer to an order of the images, e.g. where the "first" image is captured before the "second", "third", and "fourth" images, rather the naming "first", "second", "third", and "fourth" images is for distinguishing the different images.

The first, second, third and/or fourth image may be a complete image and/or a part of an image, such as image data. A complete image may be in a file format such as tif or jpg. An image may be a meta image or meta data, which may be or may become a part of an, e.g. complete, image. A meta image or meta data may be stored in computer memory for temporary storage before converting it to, e.g., a complete image in e.g. tif or jpg file format.

The third and the fourth images, which are images of the object including the projected laser light on the overlapping region, may be meta data.

An image may comprise line streams, and the line streams may comprise pixels.

Pixel may be used to define the resolution of a digital image (photo). Photo resolution may be calculated by multiplying the width and height of a sensor in pixel. Digital cameras may use photosensitive electronics, either charge-coupled device (CCD) or complementary metal-oxide-semiconductor (CMOS) image sensors, consisting of a large number of single sensor elements, each of which records a measured intensity level.

A pixel may be represented by a multicomponent colour value with respective values, each with a predefined bit-depth, for each respective colour. A multi-component value may be a so-called RGB value, CMYK value or another colour representation.

It is an advantage of the scanning device that it solves different problems with alignment of the image sensors, with adjustment of focus, and with matching and stitching of the images from the different image sensors.

It is an advantage of the scanning device that it can be used both for alignment of the image sensors, e.g. in a calibration before an actual scanning of an object; and for adjustment of focus of an object being scanning, e.g. when the height of the object varies; and for scaling, matching and stitching of the images in the overlapping regions.

It is an advantage of the scanning device that the laser component, which is configured to project a laser light on the object, can be used for alignment of the image sensors; and for adjustment of the focus on the object; and for scaling, matching and stitching of the images in the overlapping regions.

It is an advantage that the laser light from the laser component can be seen as projected light on the object in the third and fourth set of images. Thereby, the positions of the laser light can be compared, and thus alignment of image sensors; adjustment of focus of image sensors; and scaling and matching/stitching of images can be performed.

In some embodiments, the first image sensor and the second image sensor each comprises three color channels, and wherein one of the three color channels is used for capturing the third and the fourth set of images of the object including the projected laser light on the overlapping region.

The first and the second image sensor comprises the same three color channels, such as red (R), green (G) and blue (B). It is the same color channel, e.g. the green color channel, in the first and the second image sensor which is used for capturing the third and fourth set of images. The selected color channel, e.g. green color channel, is configured for detecting the color, e.g. a green color, of the projected laser light, where the color of the projected laser light is determined by the wavelength of the laser, e.g. about 514 nm. As an alternative example, the selected color channel, e.g. blue color channel, is configured for detecting the color, e.g. a green color, of the projected laser light, where the color of the projected laser light is determined by the wavelength of the laser, e.g. about 514 nm.

One, such as at least one or exactly one; two, such as at least two or exactly two; three, such as exactly three of the color channels is/are used for capturing the third and the fourth set of images of the object including the projected laser light on the overlapping region.

When the scanning device is used for adjustment of focus of the object, it may be an advantage to use only one of the three color channels for capturing the third and the fourth set of images of the object including the projected laser light on the overlapping region, because the adjustment of focus of the object may be performed faster and with less processing power compared to if two or three of the color channels were used.

It is an advantage that the scanning device may be configured to adjust a focus on the object during scanning, where the scanning device is configured to detect whether the focus on the object is correct, by detecting if the positions of the projected laser light cross on the one color channel, e.g. a first color channel, are coinciding with the positions of the projected laser light cross on the one color channel, e.g. first color channel, detected during a calibration of the scanning device.

In some embodiments, the first image sensor and the second image sensor each comprises three color channels, and wherein two of the three color channels are used for capturing the third and the fourth set of images of the object including the projected laser light on the overlapping region.

The first and the second image sensor comprises the same three color channels, such as red (R), green (G) and blue (B). It is the same color channels, e.g. the green and the blue color channels, in the first and the second image sensor which are used for capturing the third and fourth set of images. The selected color channels, e.g. green and blue color channels, are configured for detecting the color, e.g. a green color, of the projected laser light, where the color of the projected laser light is determined by the wavelength of the laser, e.g. about 514 nm. As an alternative example, the selected color channels, e.g. the red and the green color channels, are configured for detecting the color, e.g. a yellow-green color, of the projected laser light, where the color of the projected laser light is determined by the wavelength of the laser, e.g. about 575 nm.

Two, such as at least two or exactly two; or three, such as exactly three of the color channels are used for capturing the third and the fourth set of images of the object including the projected laser light on the overlapping region.

When the scanning device is used for alignment of image sensors, it may be an advantage to use two of the three color channels for capturing the third and the fourth set of images of the object including the projected laser light on the overlapping region, because the alignment of image sensors may be performed faster and with less processing power compared to if only one of the color channels were used, because of electronics of the scanning device, such as electrical voltage build-up, dead-band, servo control of motors using e.g. the Newton-Raphson method of iteration etc.

It is an advantage that the scanning device may be configured to detect if the first image sensor and the second image sensor are aligned and thus calibrated. If the first color channels, e.g. the green color channels, respectively, and the second color channels, e.g. the blue color channels, respectively, are coinciding, then the first image sensor and the second image sensor are considered to be aligned with each other and well-calibrated. If the first color channels, e.g. the green color channels, respectively, and the second color channels, e.g. the blue color channels, respectively, are not coinciding, then the first image sensor and the second image sensor are considered to be un-aligned with each other and not calibrated. The first image sensor and the second image sensor are configured to be aligned by moving the first image sensor and/or the second image sensor in the scanning direction until the scanning device detects that the first color channels, respectively, and the second color channels, respectively, are coinciding.

In some embodiments, the first image sensor comprises a red (R), a green (G) and a blue (B) color channel, and wherein the wavelength of the laser light is selected so that the green (G) and the blue (B) color channels, or the green (G) and the red (R) color channels, are used for capturing the third set of images of the object including the projected laser light on the overlapping region.

If the laser light is green colored, i.e. the wavelength of the laser is about 514 nm, then the blue and green color channels of the image sensors are used because their spectral responses overlap at this wavelength.

If the laser is yellow-green colored, i.e. the wavelength of the laser is about 575 nm, then the green and the red color channels of the image sensors are used because their spectral responses overlap at this wavelength.

In some embodiments, the second image sensor comprises a red (R), a green (G) and a blue (B) color channel, and wherein the wavelength of the laser light is selected so that the green (G) and the blue (B) color channels, or the green (G) and the red (R) color channels, are used for capturing the fourth set of images of the object including the projected laser light on the overlapping region.

If the laser light is green colored, i.e. the wavelength of the laser is about 514 nm, then the blue and green color channels of the image sensors are used because their spectral responses overlap at this wavelength.

If the laser is yellow-green colored, i.e. the wavelength of the laser is about 575 nm, then the green and the red color channels of the image sensors are used because their spectral responses overlap at this wavelength.

In some embodiments, the overlapping region has a range of 20 mm to 70 mm, such as a range of 30 mm to 60 mm, such as a range of 40 mm to 50 mm, such as 46.8 mm.

The range may be in one direction, such as the x direction, which is perpendicular to the scanning direction, also called the y direction, which is corresponding to the direction of the width of the object. This overlap is relatively large compared to other scanning devices, and it is an advantage with this relatively large overlap because it provides that the scanning device can be used both for alignment of the image sensors, e.g. in a calibration before an actual scanning of an object; and for adjustment of focus of an object being scanning, e.g. when the height of the object varies; and for scaling, matching and stitching of the images in the overlapping regions.

There may be an overlapping region between every neighboring image sensors. The one or more portions of the overlapping region may have a square or rectangular shape. The group of pixels may be selected within the overlapping regions to have scan area dimensions of about 20 mm to 70 mm.

The multiple image sensors may be arranged next to each other, or in a staggered configuration or zig-zag pattern with multiple overlapping regions along a scan line, transverse to a scanning direction. The predefined multiplicity of lines may represent a substantial expanse of an object e.g. about one-fourth of an object, one-third of an object, half of an object or the full expanse of an object.

In some embodiments, the scanning device is configured to detect if a first color channel of the first image sensor and a first color channel of the second sensor are coinciding in the third and fourth set of images, by detecting if the positions of the projected laser light cross on the first color channel in the first image sensor and in the second image sensor are coinciding.

Thus, the scanning device is configured to perform a determination of a coincidence value/factor of/between a first color channel of the first image sensor and a first color channel of the second image sensor, in the third and fourth set of images, where the coincidence value/factor is determined based on a coincidence of the positions of the projected laser light cross on the first color channel in the first image sensor and in the second image sensor.

By the term "coinciding" is it understood that this may mean "substantially coinciding", e.g. coinciding within a predetermined accuracy/precision and/or measurement uncertainty.

The scanning device is configured to perform this detection, this it may be a processing unit in the scanning device which is configured for doing this detection and/or it may be a computer program on a connected computer which is configured for doing this detection.

The first color channel of the first and second image sensors may e.g. be the green color channel.

In some embodiments, the scanning device is configured to detect if a second color channel of the first image sensor and a second color channel of the second sensor are coinciding in the third and fourth set of images, by detecting if the positions of the projected laser light cross on the second color channel in the first image sensor and in the second image sensor are coinciding.

Thus, the scanning device is configured to perform a determination of a coincidence value/factor of/between a second color channel of the first image sensor and a second color channel of the second image sensor, in the third and fourth set of images, where the coincidence value/factor is determined based on a coincidence of the positions of the projected laser light cross on the second color channel in the first image sensor and in the second image sensor.

By the term "coinciding" is it understood that this may mean "substantially coinciding", e.g. coinciding within a predetermined accuracy/precision and/or measurement uncertainty.

The scanning device is configured to perform this detection, this it may be a processing unit in the scanning device which is configured for doing this detection and/or it may be a computer program on a connected computer which is configured for doing this detection.

The second color channel of the first and second image sensors may e.g. be the blue color channel.

In some embodiments, if the first color channels, respectively, and the second color channels, respectively, are coinciding, then the first image sensor and the second image sensor are considered to be aligned with each other and well-calibrated.

Thus, the scanning device is configured to perform a determination of a coincidence value/factor of/between the color channels of the first image sensor and the second image sensor, in the third and fourth set of images, where the coincidence value/factor is determined based on a coincidence of the positions of the projected laser light cross on the color channels in the first image sensor and in the second image sensor.

By the term "coinciding" is it understood that this may mean "substantially coinciding", e.g. coinciding within a predetermined accuracy/precision and/or measurement uncertainty.

The scanning device is configured to perform this detection, this it may be a processing unit in the scanning device which is configured for doing this detection and/or it may be a computer program on a connected computer which is configured for doing this detection.

The first color channel of the first and second image sensors may e.g. be the green color channel. The second color channel of the first and second image sensors may e.g. be the blue color channel.

In some embodiments, if the first color channels, respectively, and the second color channels, respectively, are not coinciding, then the first image sensor and the second image sensor are considered to be un-aligned with each other and not calibrated.

Thus, the scanning device is configured to perform a determination of a coincidence value/factor of/between the color channels of the first image sensor and the second image sensor, in the third and fourth set of images, where the coincidence value/factor is determined based on a coincidence of the positions of the projected laser light cross on the color channels in the first image sensor and in the second image sensor.

By the term "coinciding" is it understood that this may mean "substantially coinciding", e.g. coinciding within a predetermined accuracy/precision and/or measurement uncertainty.

The scanning device is configured to perform this detection, this it may be a processing unit in the scanning device which is configured for doing this detection and/or it may be a computer program on a connected computer which is configured for doing this detection.

The first color channel of the first and second image sensors may e.g. be the green color channel. The second color channel of the first and second image sensors may e.g. be the blue color channel.

In some embodiments, the first image sensor and the second image sensor are configured to be aligned by moving the first image sensor and/or the second image sensor in the scanning direction until the scanning device detects that the first color channels, respectively, and the second color channels, respectively, are coinciding.

Thus, the scanning device is configured to perform a determination of a coincidence value/factor of/between the color channels of the first image sensor and the second image sensor, in the third and fourth set of images, where the coincidence value/factor is determined based on a coincidence of the positions of the projected laser light cross on the color channels in the first image sensor and in the second image sensor.

By the term "coinciding" is it understood that this may mean "substantially coinciding", e.g. coinciding within a predetermined accuracy/precision and/or measurement uncertainty.

The scanning device is configured to perform this detection, this it may be a processing unit in the scanning device which is configured for doing this detection and/or it may be a computer program on a connected computer which is configured for doing this detection.

The first color channel of the first and second image sensors may e.g. be the green color channel. The second color channel of the first and second image sensors may e.g. be the blue color channel.

It is an advantage that because the projected laser light is shaped as a cross (x) or half a cross (v), then there are two positions on each color channels where the laser hits, and therefore it is possible to detect which image sensor and/or which direction to move the image sensor in.

It is an advantage that because of using two color channels on each image sensor, it is possible to detect which image sensor and/or which direction to move the image sensor in.

It is an advantage that because the projected laser light is shaped as a cross (x) or half a cross (v) and the e.g. green and blue lines on the image sensor have a distance to each other, it is possible to detect which direction to move the image sensor in, in order to get closer to the center of the laser cross.

Typically, the image sensor shall be moved in the y-direction. Alternatively and/or additionally, the plate for supporting the object is configured to move when the image sensors are in a fixed position.

There may be a so-called slack in the scanning device, which means that when the image sensor is moved in one direction, the movement may not start immediately when the motor, which is moving the image sensor, is started, and the movement may also not stop immediately when the motor is stopped.

In some embodiments, wherein the scanning device is configured to adjust a focus on the object, where the scanning device is configured to detect whether the focus on the object is correct, by detecting if the positions of the projected laser light cross on the first color channel are coinciding with the positions of the projected laser light cross on the first color channel detected during a calibration of the scanning device.

It is an advantage that the scanning device is configured to adjust a focus before scanning an object having a height above the horizontally arranged plate for supporting the object in the scanning device, where the height of the object is different from a height of an object used during calibration.

Thus, the scanning device is configured to adjust a focus on the object, where the scanning device is configured to determine a correctness of the focus on the object, where the correctness of the focus is determined by determining a coincidence value/factor of/between the positions of the projected laser light cross on the first color channel and the positions of the projected laser light cross on the first color channel during a calibration of the scanning device.

The first color channel may be the green color channel.

In some embodiments, the scanning device is configured to adjust a focus on the object, where the scanning device is configured to detect whether the focus on the object is correct, by detecting if the positions of the projected laser light cross on the second color channel are coinciding with the positions of the projected laser light cross on the second color channel detected during a calibration of the scanning device.

This embodiment corresponds to the embodiment above, but where the second color channel may be the blue color channel.

In some embodiments, if the positions of the projected laser light cross on the first color channel and on the second color channel, respectively, are coinciding with the positions of the projected laser light cross on the first color channel and on the second color channel, respectively, detected during a calibration of the scanning device, then the focus on the object is considered to be correct.

In some embodiments, if the positions of the projected laser light cross on the first color channel and on the second color channel, respectively, are not coinciding with the positions of the projected laser light cross on the first color channel and on the second color channel, respectively, detected during a calibration of the scanning device, then the focus on the object is considered to be incorrect.

Thus, the scanning device is configured to determine a correctness of the focus on the object, where the correctness of the focus is determined by determining a coincidence value/factor of/between the positions of the projected laser light cross on the first and second color channels and the positions of the projected laser light cross on the first and second color channels during a calibration of the scanning device.

The first color channel may be the green color channel. The second color channel may be the blue color channel.

In some embodiments, the focus on the object is configured to be corrected by changing the distance from the first and the second image sensors to the object.

The correction of the focus may be performed by matching the two laser projections, e.g. lines or crosses, to each other, which can be performed by adjusting the distance between the object and the image sensors before scanning.

In some embodiments, the scanning device is configured for stitching/matching the first set of images, captured by the first image sensor, with the second set of images, captured by the second image sensor, by tracking the position of the projected laser light cross on the object in the overlapping region in the third set of images, captured by the first image sensor, and in the fourth set of images, captured by the second image sensor.

The first and second set of images are captured using the light source of the scanning device, and the laser light is off. The third and fourth set of images are captured with the laser light on, and the light source off.

It is an advantage that because the first and second image sensor cover the overlapping region, the scanning device is configured for stitching/matching the first and second set of images because the position of the projected laser light is tracked on the third and fourth set of images, which also captures the overlapping region.

In some embodiments, if scanning an uneven object, the scanning device is configured for scaling the first set of images, captured by the first image sensor, relative to the second set of images, captured by the second image sensor, by tracking the position of the projected laser light cross on the object in the overlapping region in the third set of images, captured by the first image sensor, and in the fourth set of images, captured by the second image sensor.

The first and second set of images are captured using the light source of the scanning device, and the laser light is off. The third and fourth set of images are captured with the laser light on, and the light source off.

It is an advantage that because the first and second image sensor cover the overlapping region, the scanning device is configured for also scaling the first and second set of images because the position of the projected laser light is tracked on the third and fourth set of images, which also captures the overlapping region.

Thus, if e.g. the height of the object changes across the object, then the first and second set of images can be scaled relative to each other, such that the scaling of the final digital image is correct in all pixels.

It is an advantage that during scanning, the matching may be performed "live" from scan line to scan line.

The scan may come out of focus due to a variable thickness of the object, and the distance between the two laser lines seen by each image sensor may be used to scale the image using calibrated values to compensate.

The image sensor matching may be performed by mapping the scanned image, e.g. first or second image, and scanned laser image, e.g. third or fourth images, of each image sensor and then matching the overlap of the two image sensors.

It is an advantage that using the projected laser light in this situation may make matching easier even if there is no image information in the scanned area.

According to an aspect, disclosed is a method for digital image scanning of a surface of an object using a scanning device. The scanning device comprises a light source, a first image sensor, a second image sensor, and a laser component. The method comprises capturing a first set of images, by the first image sensor, of a first region of the object, the first region being illuminated by the light source. The method comprises capturing a second set of images, by the second image sensor, of a second region of the object, the second region being illuminated by the light source. The first image sensor and the second image sensor cover an overlapping region on the object, the overlapping region comprising a part of the first region of the object and a part of the second region of the object. The method comprises projecting a laser light onto the overlapping region on the object, by the laser component, wherein the projected laser light has a shape of a cross on the object. The method comprises capturing a third set of images, by the first image sensor, of the object including the projected laser light on the overlapping region. The method comprises capturing a fourth set of images, by the second image sensor, of the object including the projected laser light on the overlapping region.

In some embodiments, the first image sensor and the second image sensor each comprises three color channels, and wherein one of the three color channels is used for capturing the third and the fourth set of images of the object including the projected laser light on the overlapping region.

In some embodiments, the first image sensor and the second image sensor each comprises three color channels, and wherein two of the three color channels are used for capturing the third and the fourth set of images of the object including the projected laser light on the overlapping region.

In some embodiments, the first image sensor comprises a red (R), a green (G) and a blue (B) color channel, and wherein the wavelength of the laser light is selected so that the green (G) and the blue (B) color channels, or the green (G) and the red (R) color channels, are used for capturing the third set of images of the object including the projected laser light on the overlapping region.

In some embodiments, the second image sensor comprises a red (R), a green (G) and a blue (B) color channel, and wherein the wavelength of the laser light is selected so that the green (G) and the blue (B) color channels, or the green (G) and the red (R) color channels, are used for capturing the fourth set of images of the object including the projected laser light on the overlapping region.

In some embodiments, the overlapping region has a range of 20 mm to 70 mm, such as a range of 30 mm to 60 mm, such as a range of 40 mm to 50 mm, such as 46.8 mm.

In some embodiments, the method comprises detecting if a first color channel of the first image sensor and a first color channel of the second sensor are coinciding in the third and fourth set of images, by detecting if the positions of the projected laser light cross on the first color channel in the first image sensor and in the second image sensor are coinciding.

In some embodiments, the method comprises detecting if a second color channel of the first image sensor and a second color channel of the second sensor are coinciding in the third and fourth set of images, by detecting if the positions of the projected laser light cross on the second color channel in the first image sensor and in the second image sensor are coinciding.

In some embodiments, if the first color channels, respectively, and the second color channels, respectively, are coinciding, then the first image sensor and the second image sensor are considered to be aligned with each other and well-calibrated.

In some embodiments, if the first color channels, respectively, and the second color channels, respectively, are not coinciding, then the first image sensor and the second image sensor are considered to be un-aligned with each other and not calibrated.

In some embodiments, the method comprises aligning the first image sensor and the second image sensor by moving the first image sensor and/or the second image sensor in the scanning direction until detecting that the first color channels, respectively, and the second color channels, respectively, are coinciding.

In some embodiments, the method comprises adjusting a focus on the object, where the method comprises detecting whether the focus on the object is correct, by detecting if the positions of the projected laser light cross on the first color channel are coinciding with the positions of the projected laser light cross on the first color channel detected during a calibration of the scanning device.

In some embodiments, the method comprises adjusting a focus on the object, where the method comprises detecting whether the focus on the object is correct, by detecting if the positions of the projected laser light cross on the second color channel are coinciding with the positions of the projected laser light cross on the second color channel detected during a calibration of the scanning device.

In some embodiments, if the positions of the projected laser light cross on the first color channel and on the second color channel, respectively, are coinciding with the positions of the projected laser light cross on the first color channel and on the second color channel, respectively, detected during a calibration of the scanning device, then the focus on the object is considered to be correct.

In some embodiments, if the positions of the projected laser light cross on the first color channel and on the second color channel, respectively, are not coinciding with the positions of the projected laser light cross on the first color channel and on the second color channel, respectively, detected during a calibration of the scanning device, then the focus on the object is considered to be incorrect.

In some embodiments, the focus on the object is configured to be corrected by changing the distance from the first and the second image sensors to the object.

In some embodiments, the method comprises stitching/matching the first set of images, captured by the first image sensor, with the second set of images, captured by the second image sensor, by tracking the position of the projected laser light cross on the object in the overlapping region in the third set of images, captured by the first image sensor, and in the fourth set of images, captured by the second image sensor.

In some embodiments, if scanning an uneven object, the method comprises scaling the first set of images, captured by the first image sensor, relative to the second set of images, captured by the second image sensor, by tracking the position of the projected laser light cross on the object in the overlapping region in the third set of images, captured by the first image sensor, and in the fourth set of images, captured by the second image sensor.

There is also provided a data processing system having stored there on program code means adapted to cause the data processing system to perform the steps of the above method, when said program codes means are executed on the data processing system.

There is also provided a computer program product comprising program code means adapted to cause a data processing system to perform the steps of the above method, when said program code means are executed on the data processing system.

There is also provided a computer program product according to the above method comprising a computer-readable medium having stored thereon the program code means.

There is also provided a computer data signal embodied in a carrier wave and representing sequences of instructions which, when executed by a processor, cause the processor to perform the steps of the above method.

Embodiments of the invention comprising the method steps can be implemented in digital electronic circuitry, or in computer hardware, firmware, software, or in combinations of them.

Here and in the following, the term 'processor' is intended to comprise any circuit and/or device suitably adapted to perform the functions described herein. In particular, the above term comprises general purpose or proprietary programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

The invention can be implemented as a computer program product, i.e. a computer program tangibly embodied on a computer-readable medium such as an information carrier, e.g. in a machine-readable storage device, for execution by, or to control the operation of, data processing apparatus, e.g. a programmable processor, a computer, or multiple computers. A computer program, i.e. code means, can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers.

The present invention relates to different aspects including the scanning device and the method described above and in the following, and corresponding device parts, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which:

FIG. 1a shows the scanning device in a side-view. FIG. 1b shows the scanning device in a top-view. FIG. 1c shows the scanning device in front-view.

DETAILED DESCRIPTION

Figure 1A:
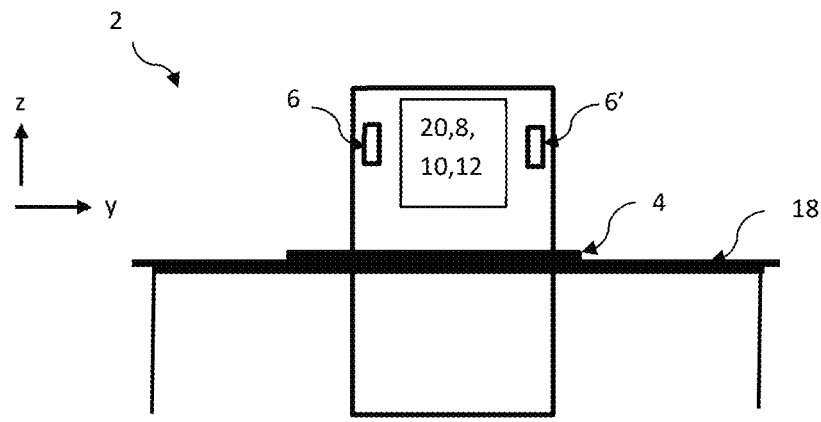
FIGS. 1a, 1b and 1c schematically illustrate an exemplary scanning device 2.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Figure 1B:
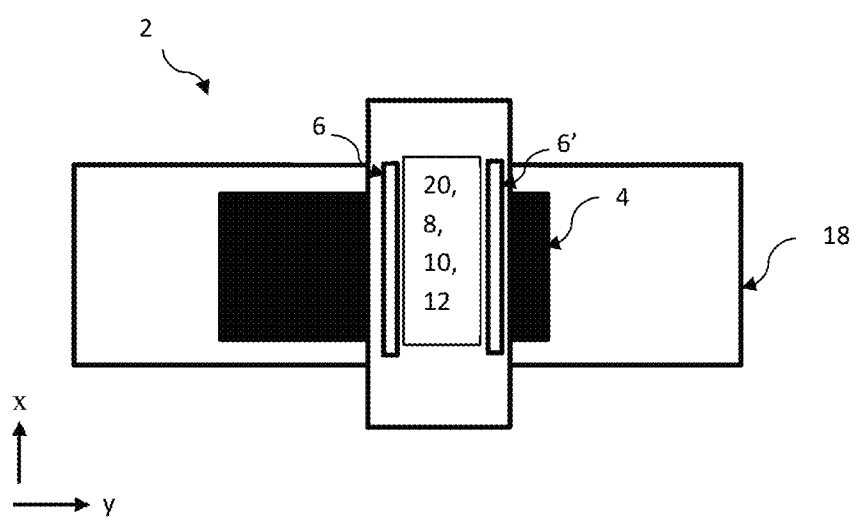
Figure 1C:
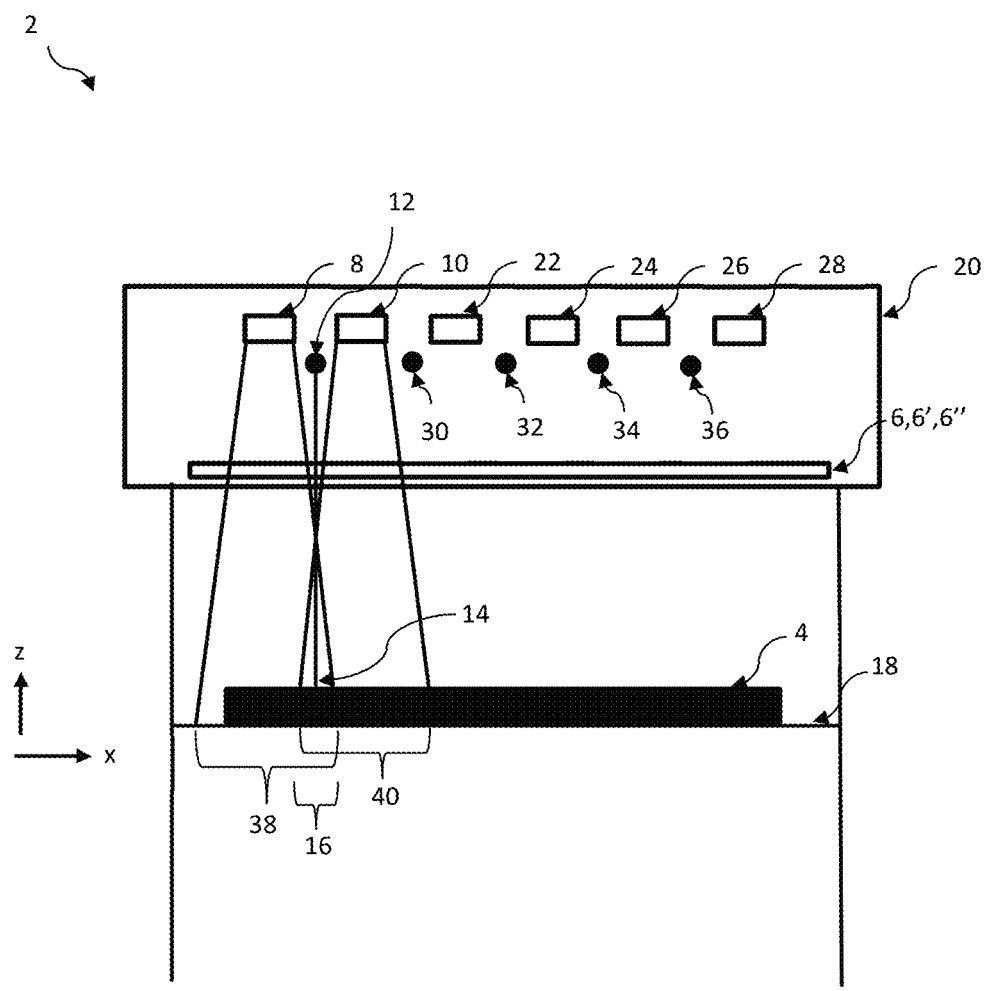

FIGS. 1a, 1b and 1c schematically illustrate an exemplary scanning device 2. FIG. 1a shows the scanning device in a side-view. FIG. 1b shows the scanning device in a top-view. FIG. 1c shows the scanning device in front-view.

FIGS. 1a, 1b and 1c shows the scanning device 2 for digital image scanning of a surface of an object 4. The scanning device 2 comprising a light source 6 for illuminating the object 4. The scanning device 2 comprising a first image sensor 8 configured for capturing a first set of images of a first region 28 of the object, where the first region 38 is illuminated by the light source 6. The scanning device 2 comprising a second image sensor 10 configured for capturing a second set of images of a second region 40 of the object 4, where the second region 40 is illuminated by the light source 6. The scanning device 2 comprising a laser component 12 configured for projecting laser light 14 onto the object 4. The projected laser light 14 has a shape of a cross on the object 4. The first image sensor 8 and the second image sensor 12 are configured to cover an overlapping region 16 on the object 4. The overlapping region 16 comprising a part of the first region 38 of the object 4 and a part of the second region 40 of the object 4. The laser light 14 from the laser component 12 is configured to be projected onto the overlapping region 16. The first image sensor 8 and the second image sensor 10 are configured for capturing a third set of images and a fourth set of images, respectively, of the object 4 including the projected laser light 14 on the overlapping region 16.

The scanning device 2 may comprise a horizontally arranged plate 18 for supporting the object 4 which can be laid on the plate 18 and face upwards. Above the plate 18, a longitudinal scan bar 20 may extend across the full width of the plate 18 and may carry an optical system, comprising the line scanning image sensors 8, 10 or cameras, for performing line scanning, as well as comprising the light source(s) 6. The scan bar 20 may also comprise rollers to support the plate 18. The plate 18 supporting the object 4 may be configured to move in a direction, e.g. in a transverse direction, to the orientation of the longitudinal scan bar 20. While the plate 18 supporting the object 4 moves, an electronic circuit acquires line image data from the line scanning image sensors or cameras to produce a digital image of the object 4. Thereby the object 4 is scanned line-by-line.

The light source 6 may comprise two lamps, such as a rear focused linear light source 6' and/or a front focused linear light source 6".

The first image sensor 8 and the second image sensor 10 may be similar image sensors. The first image sensor 8 and the second image sensor 10 may be arranged next to each other in the x-direction.

The first image sensor 8, the second image sensor 10, and the light source 6 may be arranged in the scan bar 20, and the plate 18 which supports the object 4 moves relative to the scan bar 20, and an electronic circuit may acquires line image data from the image sensors 8, 10 to produce a digital image of the object 4. Thereby the object 4 is scanned line-by-line. Thus a new region of the object 4 is captured in the next line. The object 4 may be scanned in the y-direction.

The scanning device 2 may comprise more than two image sensors, i.e. the first image sensor 8 and the second image sensor 10. The scanning device 2 may comprise a third image sensor 22, a fourth image sensor 24, a fifth image sensor 26, a sixth image sensor 28 etc. The image sensors may be similar image sensors. The third image sensor 22 may capture a set of images of a third region of the object 4. The fourth image sensor 24 may capture a set of images of a fourth region of the object. The fifth image sensor 26 may capture a set of images of a fifth region of the object. The sixth image sensor 28 may capture a set of images of a sixth region of the object. The image sensors 8, 10, 22, 24, 26, 28 may be arranged next to each other in the scan bar 20. The image sensors 8, 10, 22, 24, 26, 28 may be arranged next to each other in the x-direction. The image sensors 8, 10, 22, 24, 26, 28 are configured for capturing their sets of images at the same time, such as substantially the same time, such that the first, second, third, fourth, fifth, sixth etc. regions of the object 4 are captured at the same time, for each line. Thus the scanning device 2 may comprise a plurality of image sensors 8, 10, 22, 24, 26, 28 or scanner cameras e.g. line arrays.

The laser component 12 may be arranged between the first image sensor 8 and the second image sensor 10. The laser component 12 may comprise more than one laser component, such as a first laser component 12, a second laser component 30, a third laser component 32, a fourth laser component 34, a fifth laser component 36 etc. The first laser component 12 may be arranged between the first image sensor 8 and the second image sensor 10. The second laser component 30 may be arranged between the second image sensor 10 and the third image sensor 22. The third laser component 32 may be arranged between the third image sensor 22 and the fourth image sensor 24. The fourth laser component 34 may be arranged between the fourth image sensor 24 and the fifth image sensor 26. The fifth laser component 36 may be arranged between the fifth image sensor 28 and the sixth image sensor 28. Thus there may be five laser components and six image sensors.

The laser component 12 and the light source 6 are configured to be turned on at different times, such as alternately, in a shifting manner, in a switching manner etc. When the laser component 12 is on, the light source 6 is configured to be off. When the light source 6 is on, the laser component 12 is configured to be off.

The third and fourth set of images are not captured at the same time as the first and second set of images, because the light source 6 and laser light 14 are not used, e.g. on, at the same time, but alternately.

The first and third set of images captured by the first image sensor 8 may be of the same first region of the object 4. The second and fourth images captured by the second image sensor 10 may be of the same second region of the object 4.

The overlapping region 16 may have a range of 20 mm to 70 mm, such as a range of 30 mm to 60 mm, such as a range of 40 mm to 50 mm, such as 46.8 mm. The range may be in one direction, such as the x direction, which is perpendicular to the scanning direction, also called the y direction, which is corresponding to the direction of the width of the object 4. There may be an overlapping region 16, 16', 16", between every neighboring image sensors. The one or more portions of the overlapping region may have a square or rectangular shape. The group of pixels may be selected within the overlapping regions to have scan area dimensions of about 20 mm to 70 mm.

Figure 2A:
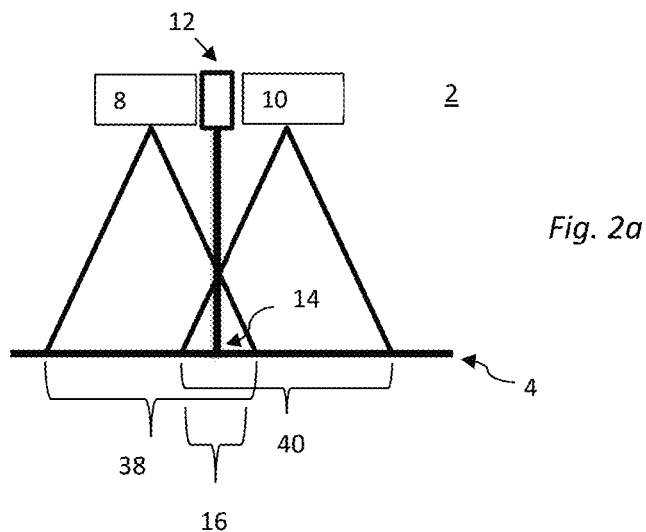
FIGS. 2a, 2b and 2c schematically illustrate examples of the scanning device 2 used for alignment of image sensors, e.g. in a calibration before an actual scanning of an object.
Figure 2B:
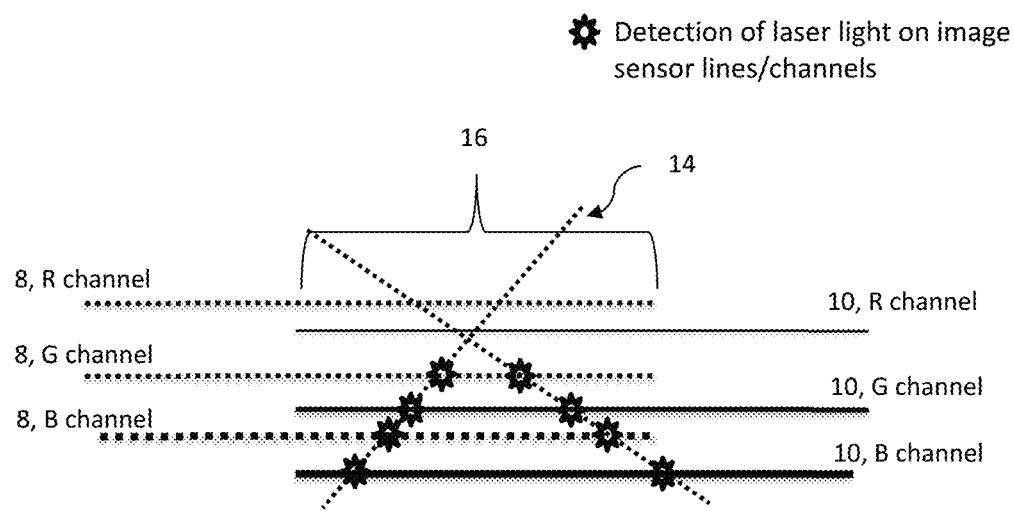
Figure 2C:
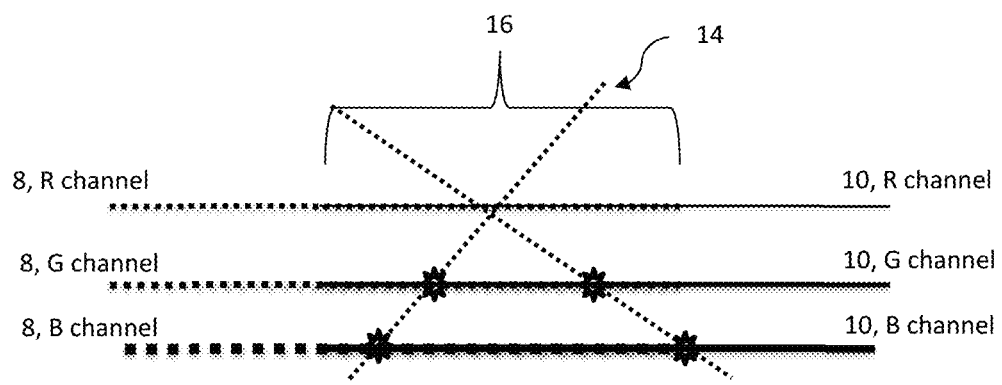

FIGS. 2a, 2b and 2c schematically illustrate examples of the scanning device 2 used for alignment of image sensors, e.g. in a calibration before an actual scanning of an object.

FIG. 2a shows that the scanning device 2 comprises a first image sensor 8 configured for capturing a first set of images of a first region 38 of the object 4, where the first region is illuminated by the light source. The scanning device 2 comprises a second image sensor 10 configured for capturing a second set of images of a second region 40 of the object 4, where the second region 40 is illuminated by the light source. The scanning device 2 comprises a laser component 12 configured for projecting laser light 14 onto the object 4.

FIGS. 2b and 2c show that the projected laser light 14 has a shape of a cross on the object 4.

FIGS. 2a, 2b and 2c show that the first image sensor 8 and the second image sensor 12 are configured to cover an overlapping region 16 on the object 4. The overlapping region 16 comprising a part of the first region 38 of the object 4 and a part of the second region 40 of the object 4. The laser light 14 from the laser component 12 is configured to be projected onto the overlapping region 16. The first image sensor 8 and the second image sensor 10 are configured for capturing a third set of images of the first region 38, and a fourth set of images of the second region 40, respectively, of the object 4 including the projected laser light 14 on the overlapping region 16.

FIGS. 2b and 2c show that the first image sensor 8 and the second image sensor 10 each comprises three color channels red (R), green (G) and blue (B). The red color channel of the first image sensor 8 is named "8, R channel". The green color channel of the first image sensor 8 is named "8, G channel". The blue color channel of the first image sensor 8 is named "8, B channel". The red color channel of the second image sensor 10 is named "10, R channel". The green color channel of the second image sensor 10 is named "10, G channel". The blue color channel of the second image sensor 10 is named "10, B channel".

FIGS. 2b and 2c show that two of the three color channels may be used for capturing the third and the fourth set of images of the object including the projected laser light on the overlapping region.

FIGS. 2b and 2c show that it is the same color channels, e.g. the green G and the blue B color channels, in the first image sensor 8 and the second image sensor 10 which are used for capturing the third and fourth set of images. The selected color channels, e.g. green G and blue B color channels, are configured for detecting the color, e.g. a green color, of the projected laser light 14, where the color of the projected laser light 14 is determined by the wavelength of the laser component 12, e.g. about 514 nm.

FIGS. 2b and 2c show a star (*) on the color channels R, G, B, of the image sensors 8, 10, at the positions where the laser light 14 is detected.

FIGS. 2b and 2c show that the scanning device is configured to detect if a first color channel, e.g. G, of the first image sensor 8, and a first color channel, e.g. G, of the second image sensor 10, are coinciding in the third and fourth set of images, by detecting if the positions of the projected laser light cross 14 on the first color channel, G, in the first image sensor 8, and in the second image sensor 10 are coinciding.

FIGS. 2b and 2c show that the scanning device is configured to detect if a second color channel, e.g. B, of the first image sensor 8, and a second color channel, e.g. B, of the second image sensor 10, are coinciding in the third and fourth set of images, by detecting if the positions of the projected laser light cross 14 on the second color channel B in the first image sensor 8 and in the second image sensor 10 are coinciding.

FIG. 2b shows that the first color channels, G, respectively, and the second color channels, B, respectively, are not coinciding, because the position of the laser light 14 is not coinciding, and the first image sensor 8 and the second image sensor 10 are thus considered to be un-aligned with each other and not calibrated.

FIG. 2c shows that the first color channels, G, respectively, and the second color channels, B, respectively, are coinciding, because the position of the laser light 14 is coinciding, and the first image sensor 8 and the second image sensor 10 are thus considered to be aligned with each other and well-calibrated.

The first image sensor 8 and the second image sensor 10 are configured to be aligned by moving the first image sensor 8 and/or the second image sensor 10 in the scanning direction until the scanning device 2 detects that the first color channels, G, respectively, and the second color channels, B, respectively, are coinciding.

Because the projected laser light is shaped as a cross (x) or half a cross (v), then there are two positions on each color channels where the laser hits, and therefore it is possible to detect which image sensor and/or which direction to move the image sensor in. Because of using two color channels on each image sensor, it is possible to detect which image sensor and/or which direction to move the image sensor in. Typically, the image sensor shall be moved in the y-direction.

FIG. 3a, 3b, 3c, 3d, 3e and 3f schematically illustrate examples of the scanning device 2 used for adjustment of focus of an object being scanning, e.g. when the height of the object varies.

Figure 3A:
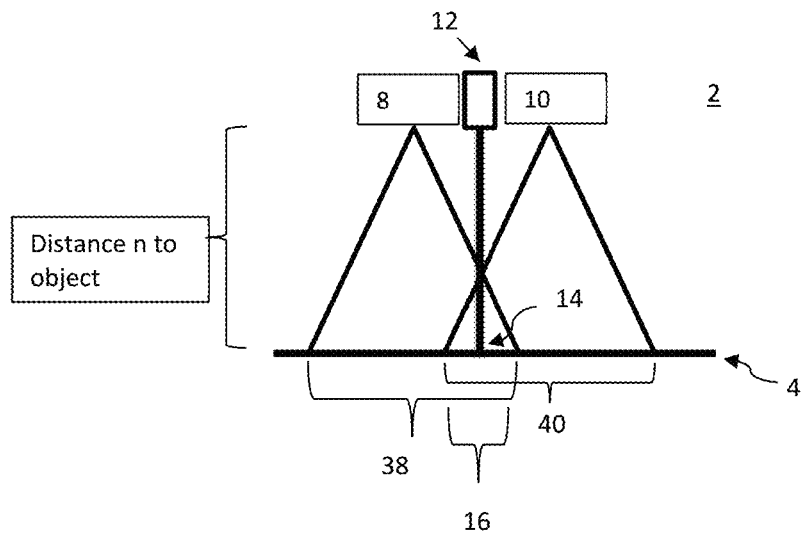
FIG. 3a, 3b, 3c, 3d, 3e and 3f schematically illustrate examples of the scanning device 2 used for adjustment of focus of an object being scanning, e.g. when the height of the object varies.
Figure 3B:
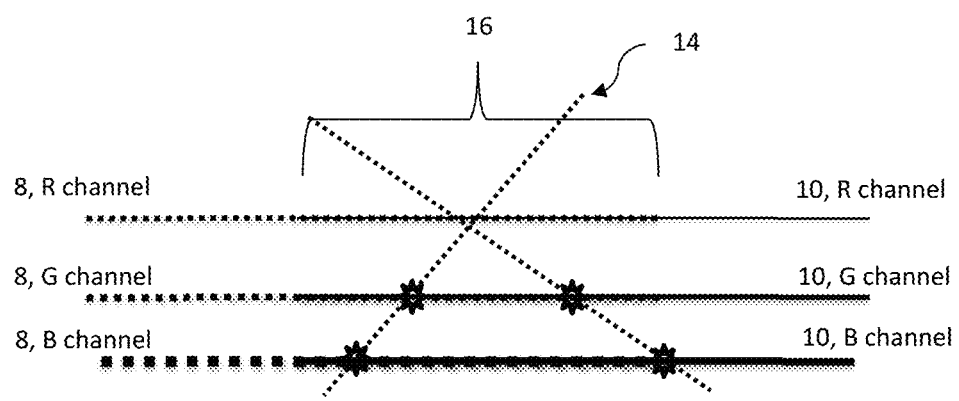

FIGS. 3a and 3b show a situation where the image sensors 8 and 10 are in focus with distance n to the object 4, e.g. during a calibration.

Figure 3C:
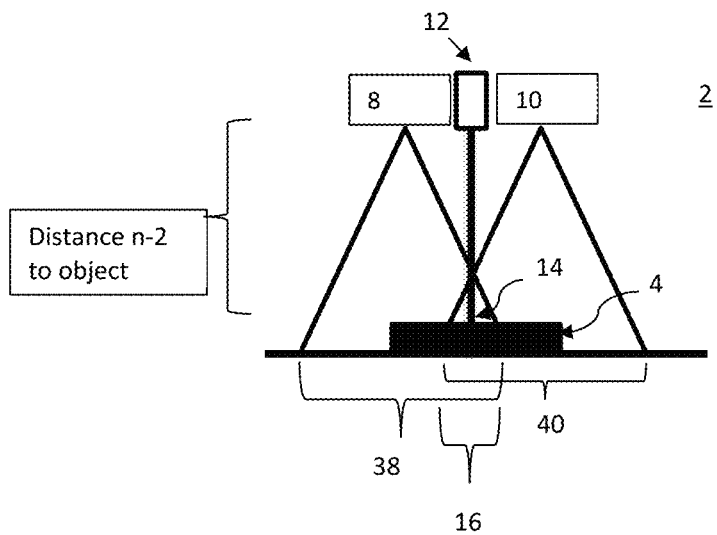
Figure 3D:
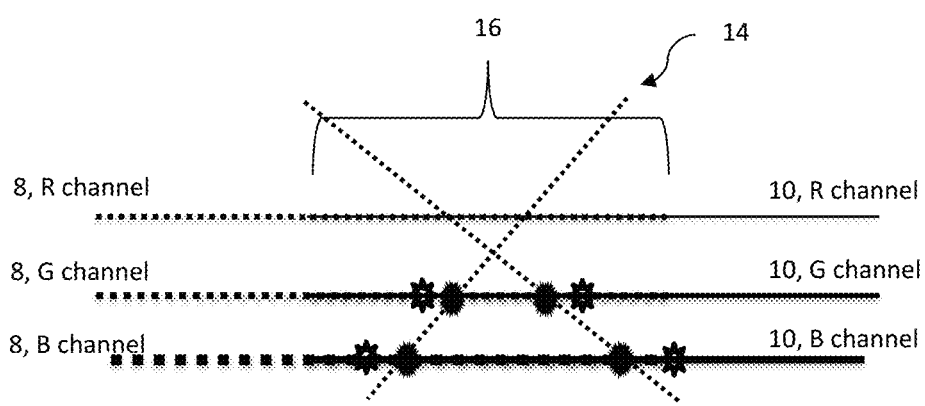

FIGS. 3c and 3d show a situation where the image sensors 8 and 10 are not in focus, because the object now has a height different from during calibration. The distance between the image sensors 8, 10 and the surface of the object 4 is n−2.

Figure 3E:
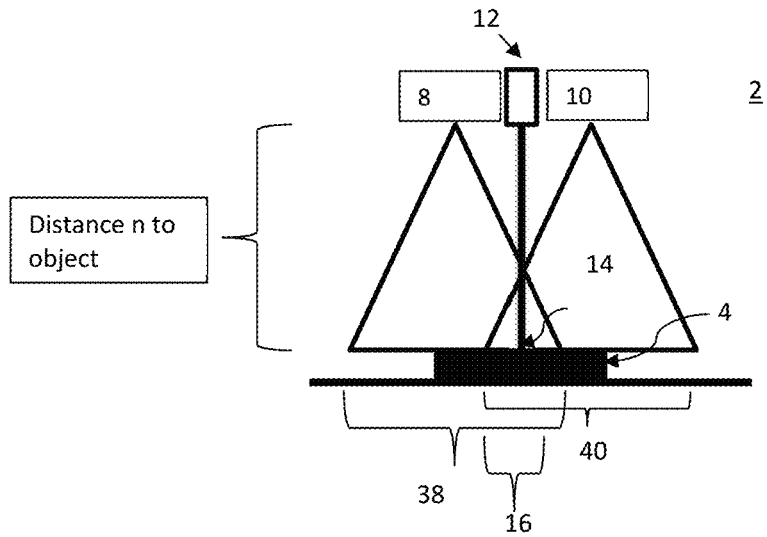
Figure 3F:
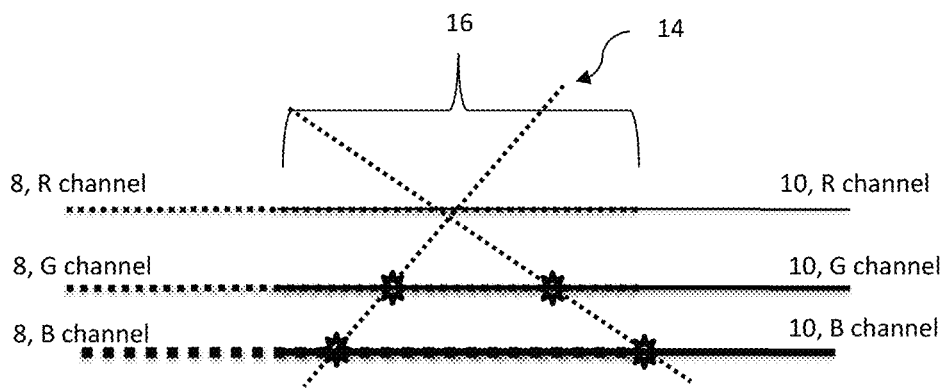

FIGS. 3e and 3f show a situation where the image sensors 8 and 10 are now again in focus with distance n to the object 4, because the image sensors 8, 10 have been elevated.

FIGS. 3a, 3c and 3e shows that the scanning device 2 comprises a first image sensor 8 configured for capturing a first set of images of a first region 38 of the object 4, where the first region is illuminated by the light source. The scanning device 2 comprises a second image sensor 10 configured for capturing a second set of images of a second region 40 of the object 4, where the second region 40 is illuminated by the light source. The scanning device 2 comprises a laser component 12 configured for projecting laser light 14 onto the object 4.

FIGS. 3b, 3d, and 3f show that the projected laser light 14 has a shape of a cross on the object 4.

FIGS. 3b, 3d, and 3f show that the first image sensor 8 and the second image sensor 12 are configured to cover an overlapping region 16 on the object 4. The overlapping region 16 comprising a part of the first region 38 of the object 4 and a part of the second region 40 of the object 4. The laser light 14 from the laser component 12 is configured to be projected onto the overlapping region 16. The first image sensor 8 and the second image sensor 10 are configured for capturing a third set of images of the first region 38, and a fourth set of images of the second region 40, respectively, of the object 4 including the projected laser light 14 on the overlapping region 16.

FIGS. 3b, 3d, and 3f show that the first image sensor 8 and the second image sensor 10 each comprises three color channels red (R), green (G) and blue (B). The red color channel of the first image sensor 8 is named "8, R channel". The green color channel of the first image sensor 8 is named "8, G channel". The blue color channel of the first image sensor 8 is named "8, B channel". The red color channel of the second image sensor 10 is named "10, R channel". The green color channel of the second image sensor 10 is named "10, G channel". The blue color channel of the second image sensor 10 is named "10, B channel".

FIGS. 3b, 3d, and 3f show that two of the three color channels may be used for capturing the third and the fourth set of images of the object including the projected laser light on the overlapping region. However, only one of the color channels may be sufficient for capturing the images for adjusting a focus.

FIGS. 3b, 3d, and 3f show that it is the same color channels, e.g. the green G and the blue B color channels, in the first image sensor 8 and the second image sensor 10 which are used for capturing the third and fourth set of images. The selected color channels, e.g. green G and blue B color channels, are configured for detecting the color, e.g. a green color, of the projected laser light 14, where the color of the projected laser light 14 is determined by the wavelength of the laser component 12, e.g. about 514 nm.

FIGS. 3b, 3d, and 3f show a star (*) on the color channels R, G, B, of the image sensors 8, 10, at the positions where the laser light 14 is detected.

FIG. 3d show a dot (°) on the color channels R, G, B, of the image sensors 8, 10, at the positions where the laser light 14 is detected during e.g. a calibration of the scanning device.

FIG. 3d show that the scanning device is configured to adjust a focus on the object 4, where the scanning device 2 is configured to detect whether the focus on the object 4 is correct, by detecting if the positions of the projected laser light cross 14 on the first color channel, e.g. G, are coinciding with the positions of the projected laser light cross on the first color channel, e.g. G, detected during a calibration of the scanning device.

The scanning device 2 is configured to adjust a focus on the object 4, where the scanning device 2 is configured to detect whether the focus on the object 4 is correct, by detecting if the positions of the projected laser light cross 14 on the second color channel, e.g. B, are coinciding with the positions of the projected laser light cross on the second color channel, e.g. B, detected during a calibration of the scanning device.

If the positions of the projected laser light cross 14 on the first color channel, e.g. G, and on the second color channel, e.g. B, respectively, are coinciding with the positions of the projected laser light cross on the first color channel, e.g. G, and on the second color channel, e.g. B, respectively, detected during a calibration of the scanning device, then the focus on the object is considered to be correct.

If the positions of the projected laser light cross 14 on the first color channel, e.g. G, and on the second color channel, e.g. B, respectively, are not coinciding with the positions of the projected laser light cross on the first color channel, e.g. G, and on the second color channel, e.g. B, respectively, detected during a calibration of the scanning device, then the focus on the object is considered to be incorrect.

FIGS. 3e and 3f show that the focus on the object 4 is configured to be corrected by changing the distance n from the first image sensor 8 and the second image sensor 10 to the object 4.

FIGS. 4a, 4b, 4c and 4d schematically illustrate examples of the scanning device 2 used for matching, stitching and/or scaling of the images from the first image sensor and the second image sensor.

The scanning device is configured for stitching/matching the first set of images 42, captured by the first image sensor, with the second set of images 44, captured by the second image sensor, by tracking the position of the projected laser light cross 14 on the object in the overlapping region 16 in the third set of images 46, captured by the first image sensor, and in the fourth set of images 48, captured by the second image sensor.

The first set of images 42 and second set of images 44 are captured using the light source of the scanning device, and the laser light 14 is off. The third set of images 46 and the fourth set of images 48 are captured with the laser light 14 on, and the light source off.

If scanning an uneven object, the scanning device is configured for scaling the first set of images 42, captured by the first image sensor, relative to the second set of images 44, captured by the second image sensor, by tracking the position of the projected laser light cross 14 on the object 4 in the overlapping region 16 in the third set of images 46, captured by the first image sensor, and in the fourth set of images 48, captured by the second image sensor.

Figure 4A:
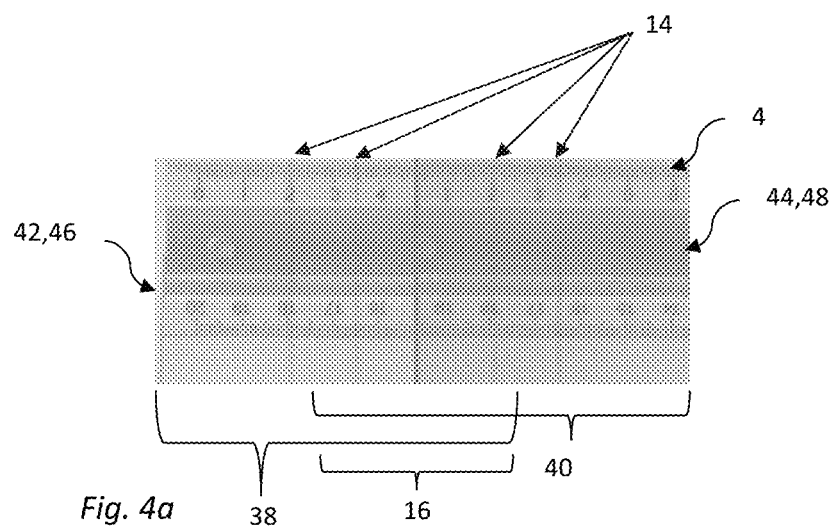
FIGS. 4a, 4b, 4c and 4d schematically illustrate examples of the scanning device 2 used for matching, stitching and/or scaling of the images from the first image sensor and the second image sensor.

FIG. 4a shows at least a part of the first set of images 42 captured by the first image sensor of the first region 38 of the object 4, and at least a part of the second set of images 44 captured by the second image sensor of the second region 40 of the object 4.

FIG. 4a shows that the third set of images 46 captured by the first image sensor, and that the fourth set of images 48 captured by the second image sensor, which include the projected laser light 14, are overlaid or added on the first set of images 42 and on the second set of images 44.

The overlapping region 16 is shown, being a part of the first region 38 and a part of the second region 40.

Figure 4B:
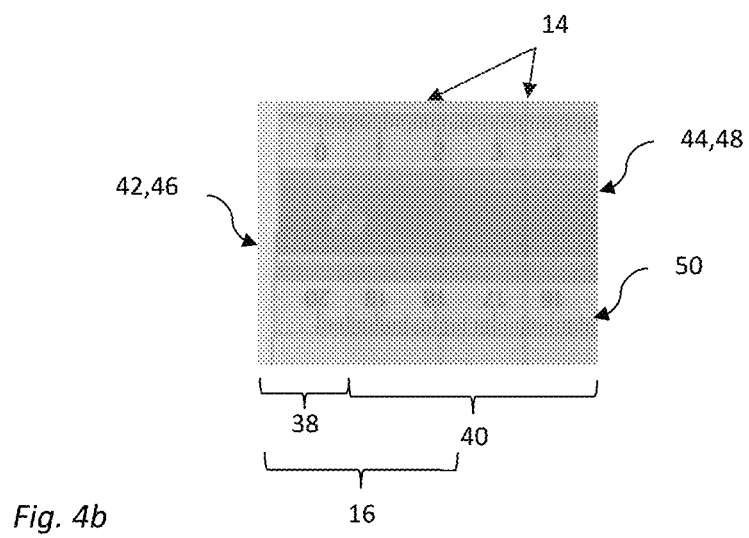

FIG. 4b shows a merged image 50 where the first set of images 42 from the first image sensor of the first region 38 is merged with the second set of images 44 from the second image sensor of the second region 40. Thus the overlapping region 16 with the projected laser light 14, from the third and fourth set of images 46, 48, is now only represented once, and not twice as in FIG. 4a. The first region 38 from the first image sensor is shown a bit brighter, and the second region 40 from the second image sensor is shown a bit darker.

Figure 4C:
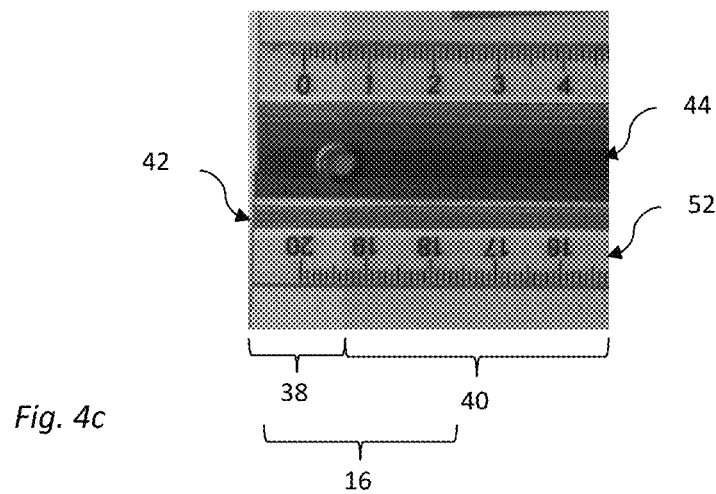

FIG. 4c shows a clean image 52 where the projected laser light from the third and fourth set of images is removed and only the content from the first set of images 42 and the second set of images 44 is shown.

The first region 38 from the first image sensor is shown a bit brighter, and the second region 40 from the second image sensor is shown a bit darker.

Figure 4D:
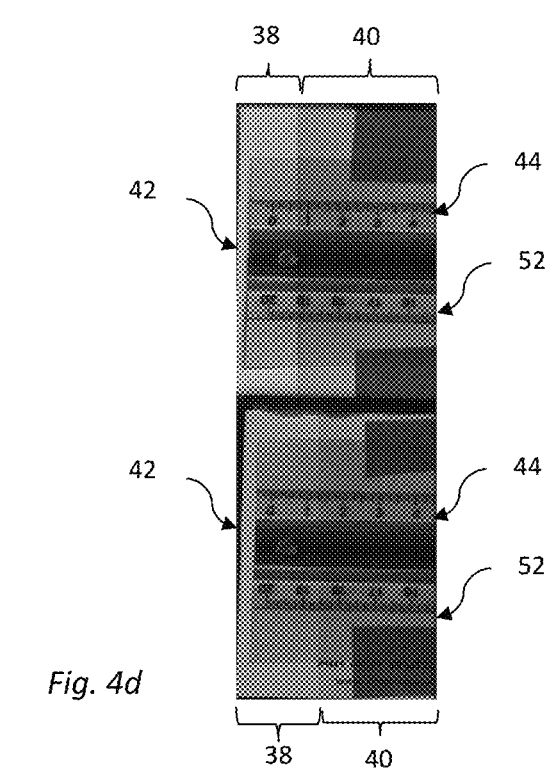

FIG. 4d shows examples of clean images 52 which are not yet calibrated in terms of focus. In the clean images 52 the projected laser light from the third and fourth set of images is removed and only the content from the first set of images 42 and the second set of images 44 is shown. The first region 38 from the first image sensor is shown a bit brighter, and the second region 40 from the second image sensor is shown a bit darker.

The clean image 52 in the top is about 8.7 mm off focus. The clean image 52 in the bottom is about 22.4 mm off focus.

Figure 5:
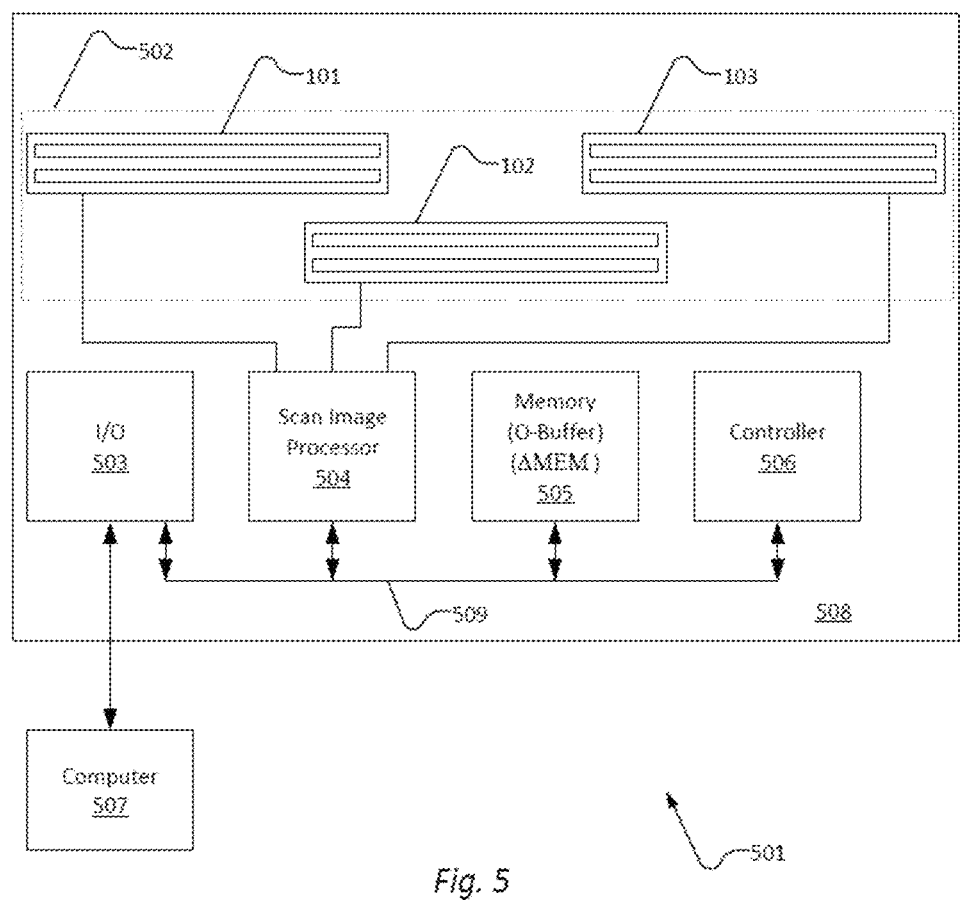
FIG. 5 shows a block diagram for a scanning device.

FIG. 5 shows a block diagram for a scanning device. The scanning device 501 comprises a structure (e.g. a scan bar) 502 carrying the images sensors 101, 102 and 103. Data, such as colour image values, from the images sensors 101, 102 and 103 are read out by means of a Scan Image Processor 504 which stores the image values in a ring-buffer (0-Buffer) in a memory 505.

In some embodiments the Scan Image Processor 504 performs the method as described above. Processed and corrected image values are then made available for retrieval or upload to a computer 507, e.g. a general purpose computer for further image processing, archiving, modification etc. as the case may be.

Alternatively, or additionally, in some embodiments the method described above is performed on a computer 507, e.g. a general purpose computer programmed to perform the method. In such embodiments the scanner 508 is configured to transfer image values recorded by the images sensors to the computer 507 via the I/O unit 503 as image values are recorded and while scanning of an object takes place e.g. line-by-line or in packets of image values. Concurrently, while the transfer of image values proceeds and while the document is being scanned, the computer processes image values according to the method described above. Thereby, processed image values i.e. a digital reproduction of the object scanned can then be made available for archiving, further processing, etc., very quickly after the scan of the physical object is completed.

Alternatively, or additionally, in some embodiments the method described above is also performed on a computer 507 and the scanner 508 is configured to transfer image values recorded by the image sensors to the computer 507 via the I/O unit 503 as image values are recorded and while scanning of an object takes place, e.g. line-by-line or in packets of image values. However, image values are then processed according to the method above, when all or substantially all image values recorded from an object have been transferred to the computer 507. This is also denoted post-processing.

The Scan Image Processor 504 performs among other tasks stitching of image values.

An I/O unit 503 provides communication, comprising transfer of image values, with the computer 507. In some embodiments the unit provides communication via a data network e.g. according to the Ethernet protocol, USB protocol, Firewire protocol or via another communications protocol.

Communication within the scanner 508 among the units 503, 504, 505 and 506 takes place mainly via a communications bus 509.

A controller 506 performs control of the scanner's operation e.g. roller feeding of the object etc. This is known in the art.

In general, image values may also be denoted image data.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

ITEMS

1. A scanning device for digital image scanning of a surface of an object, the scanning device comprising:
   a light source for illuminating the object;
   a first image sensor configured for capturing a first set of images of a first region of the object, the first region being illuminated by the light source;
   a second image sensor configured for capturing a second set of images of a second region of the object, the second region being illuminated by the light source;
   a laser component configured for projecting laser light onto the object, wherein the projected laser light has a shape of a cross on the object;
   wherein the first image sensor and the second image sensor are configured to capture/cover an overlapping region on the object, the overlapping region comprising a part of the first region of the object and a part of the second region of the object;
   wherein the laser light from the laser component is configured to be projected onto the overlapping region;
   wherein the first image sensor and the second image sensor are configured for capturing a third set of images and a fourth set of images, respectively, of the object including the projected laser light on the overlapping region.

2. The scanning device according to the preceding item, wherein the first image sensor and the second image sensor each comprises three color channels, and wherein one of the three color channels is used for capturing the third and the fourth set of images of the object including the projected laser light on the overlapping region.

3. The scanning device according to any of the preceding items, wherein the first image sensor and the second image sensor each comprises three color channels, and wherein two of the three color channels are used for capturing the third and the fourth set of images of the object including the projected laser light on the overlapping region.

4. The scanning device according to any of the preceding items, wherein the first image sensor comprises a red (R), a green (G) and a blue (B) color channel, and wherein the wavelength of the laser light is selected so that the green (G) and the blue (B) color channels, or the green (G) and the red (R) color channels, are used for capturing the third set of images of the object including the projected laser light on the overlapping region.

5. The scanning device according to any of the preceding items, wherein the second image sensor comprises a red (R), a green (G) and a blue (B) color channel, and wherein the wavelength of the laser light is selected so that the green (G) and the blue (B) color channels, or the green (G) and the red (R) color channels, are used for capturing the fourth set of images of the object including the projected laser light on the overlapping region.

6. The scanning device according to any of the preceding items, wherein the overlapping region has a range of 20 mm to 70 mm, such as a range of 30 mm to 60 mm, such as a range of 40 mm to 50 mm, such as 46.8 mm.

7. The scanning device according to any of the preceding items, wherein the scanning device is configured to detect if a first color channel of the first image sensor and a first color channel of the second sensor are coinciding in the third and fourth set of images, by detecting if the positions of the projected laser light cross on the first color channel in the first image sensor and in the second image sensor are coinciding.

8. The scanning device according to any of the preceding items, wherein the scanning device is configured to detect if a second color channel of the first image sensor and a second color channel of the second sensor are coinciding in the third and fourth set of images, by detecting if the positions of the projected laser light cross on the second color channel in the first image sensor and in the second image sensor are coinciding.

9. The scanning device according to items 7-8, wherein if the first color channels, respectively, and the second color channels, respectively, are coinciding, then the first image sensor and the second image sensor are considered to be aligned with each other and well-calibrated.

10. The scanning device according to items 7-8, wherein if the first color channels, respectively, and the second color channels, respectively, are not coinciding, then the first image sensor and the second image sensor are considered to be un-aligned with each other and not calibrated.

11. The scanning device according to the preceding item, wherein the first image sensor and the second image sensor are configured to be aligned by moving the first image sensor and/or the second image sensor in the scanning direction until the scanning device detects that the first color channels, respectively, and the second color channels, respectively, are coinciding.

12. The scanning device according to any of the preceding items, wherein the scanning device is configured to adjust a focus on the object, where the scanning device is configured to detect whether the focus on the object is correct, by detecting if the positions of the projected laser light cross on the first color channel are coinciding with the positions of the projected laser light cross on the first color channel detected during a calibration of the scanning device.

13. The scanning device according to any of the preceding items, wherein the scanning device is configured to adjust a focus on the object, where the scanning device is configured to detect whether the focus on the object is correct, by detecting if the positions of the projected laser light cross on the second color channel are coinciding with the positions of the projected laser light cross on the second color channel detected during a calibration of the scanning device.

14. The scanning device according to any of the preceding items, wherein if the positions of the projected laser light cross on the first color channel and on the second color channel, respectively, are coinciding with the positions of the projected laser light cross on the first color channel and on the second color channel, respectively, detected during a calibration of the scanning device, then the focus on the object is considered to be correct.

15. The scanning device according to any of the preceding items, wherein if the positions of the projected laser light cross on the first color channel and on the second color channel, respectively, are not coinciding with the positions of the projected laser light cross on the first color channel and on the second color channel, respectively, detected during a calibration of the scanning device, then the focus on the object is considered to be incorrect.

16. The scanning device according to any of the preceding items, wherein the focus on the object is configured to be corrected by changing the distance from the first and the second image sensors to the object.

17. The scanning device according to any of the preceding items, wherein the scanning device is configured for stitching/matching the first set of images, captured by the first image sensor, with the second set of images, captured by the second image sensor, by tracking the position of the projected laser light cross on the object in the overlapping region in the third set of images, captured by the first image sensor, and in the fourth set of images, captured by the second image sensor.

18. The scanning device according to any of the preceding items, wherein if scanning an uneven object, the scanning device is configured for scaling the first set of images, captured by the first image sensor, relative to the second set of images, captured by the second image sensor, by tracking the position of the projected laser light cross on the object in the overlapping region in the third set of images, captured by the first image sensor, and in the fourth set of images, captured by the second image sensor.

19. A method for digital image scanning of a surface of an object using a scanning device, the scanning device comprises a light source, a first image sensor, a second image sensor, and a laser component, the method comprises:
   capturing a first set of images, by the first image sensor, of a first region of the object, the first region being illuminated by the light source;
   capturing a second set of images, by the second image sensor, of a second region of the object, the second region being illuminated by the light source;
   wherein the first image sensor and the second image sensor capture/cover an overlapping region on the object, the overlapping region comprising a part of the first region of the object and a part of the second region of the object;
   projecting a laser light onto the overlapping region on the object, by the laser component, wherein the projected laser light has a shape of a cross on the object;
   capturing a third set of images, by the first image sensor, of the object including the projected laser light on the overlapping region; and capturing a fourth set of images, by the second image sensor, of the object including the projected laser light on the overlapping region.

20. A data processing system having stored there on program code means adapted to cause the data processing system to perform the steps of the method of item 19, when said program codes means are executed on the data processing system.

21. A computer program product comprising program code means adapted to cause a data processing system to perform the steps of the method of item 19, when said program code means are executed on the data processing system.

22. A computer program product according to the method of item 19, comprising a computer-readable medium having stored thereon the program code means.

23. A computer data signal embodied in a carrier wave and representing sequences of instructions which, when executed by a processor, cause the processor to perform the steps of the method of item 19.

LIST OF REFERENCES 2 scanning device
4 object
6 light source
6' rear focused linear light source
6" front focused linear light source
8 first image sensor
10 second image sensor
12 laser component
14 projected laser light
16 overlapping region
16', 16" overlapping region
18 plate for supporting the object
20 scan bar
22 third image sensor
24 fourth image sensor
26 fifth image sensor
28 sixth image sensor
30 second laser component
32 third laser component
34 fourth laser component
36 fifth laser component
38 first region
40 second region
42 first set of images
44 second set of images
46 third set of images
48 fourth set of images
50 merged image
52 clean image
501 scanning device
502 structure (e.g. a scan bar)
101, 102, 103 images sensors
503 I/O unit
504 Scan Image Processor
505 memory
506 controller
507 computer
508 scanner
509 communications bus

The invention claimed is:

1. A scanning device for digital image scanning of a surface of an object, the scanning device comprising:
a light source;
a first image sensor, which captures a first set of images of a first region of the object, the first region being illuminated by the light source;
a second image sensor, which captures a second set of images of a second region of the object, the second region being illuminated by the light source;
a laser, which projects laser light onto the object, wherein the projected laser light has a shape of a cross on the object;
wherein the first image sensor and the second image sensor capture/cover an overlapping region on the object, the overlapping region comprising a part of the first region of the object and a part of the second region of the object;
wherein the laser light from the laser is projected onto the overlapping region;
wherein the first image sensor and the second image sensor additionally capture a third set of images and a fourth set of images, respectively, of the object including the projected laser light on the overlapping region; and
wherein the first image sensor comprises a red (R), a green (G) and a blue (B) color channel, and wherein the wavelength of the laser light is selected so that the green (G) and the blue (B) color channels, or the green (G) and the red (R) color channels, capture the third set of images of the object including the projected laser light on the overlapping region.

2. The scanning device according to claim 1, wherein the first image sensor and the second image sensor each comprise three color channels, and wherein one of the three color channels captures the third and the fourth set of images of the object including the projected laser light on the overlapping region.

3. The scanning device according to claim 1, wherein the first image sensor and the second image sensor each comprise three color channels, and wherein two of the three color channels capture the third and the fourth set of images of the object including the projected laser light on the overlapping region.

4. The scanning device according to claim 1, wherein the second image sensor comprises a red (R), a green (G) and a blue (B) color channel, and wherein the wavelength of the laser light is selected so that the green (G) and the blue (B) color channels, or the green (G) and the red (R) color channels, capture the fourth set of images of the object including the projected laser light on the overlapping region.

5. The scanning device according to claim 1, wherein the overlapping region has a range of 20 mm to 70 mm.

6. The scanning device according to claim 1, wherein the scanning device detects if a first color channel of the first image sensor and a first color channel of the second sensor are coinciding in the third and fourth set of images, by detecting if the positions of the projected laser light cross on the first color channel in the first image sensor and in the second image sensor are coinciding.

7. The scanning device according to claim 1, wherein the scanning device detects if a second color channel of the first image sensor and a second color channel of the second sensor are coinciding in the third and fourth set of images, by detecting if the positions of the projected laser light cross on the second color channel in the first image sensor and in the second image sensor are coinciding.

8. The scanning device according to claim 6, wherein if the first color channel and a second color channel coincide, then the first image sensor and the second image sensor are aligned with each other.

9. The scanning device according to claim 6, wherein if the first color channel and a second color channel are not coinciding, then the first image sensor and the second image sensor are not aligned with each other.

10. The scanning device according to claim 9, wherein the first image sensor and the second image sensor are aligned by moving the first image sensor and/or the second image sensor in the scanning direction until the scanning device detects that the first color channel and the second color channel coincide.

11. The scanning device according to claim 1, wherein the scanning device adjusts a focus on the object, wherein the scanning device detects whether the focus on the object is correct, by detecting if the positions of the projected laser light cross on a first color channel coincide with the positions of the projected laser light cross on the first color channel detected during a calibration of the scanning device.

12. The scanning device according to claim 1, wherein the scanning device stitches or matches the first set of images, captured by the first image sensor, with the second set of images, captured by the second image sensor, by tracking the position of the projected laser light cross on the object in the overlapping region in the third set of images, captured by the first image sensor, and in the fourth set of images, captured by the second image sensor.

13. The scanning device according to claim 1, wherein if scanning an uneven object, the scanning device scales the first set of images, captured by the first image sensor, relative to the second set of images, captured by the second image sensor, by tracking the position of the projected laser light cross on the object in the overlapping region in the third set of images, captured by the first image sensor, and in the fourth set of images, captured by the second image sensor.

14. A method for digital image scanning of a surface of an object using a scanning device, wherein the scanning device comprises a light source, a first image sensor, a second image sensor, and a laser, the method comprising:
 capturing a first set of images, with the first image sensor, of a first region of the object, the first region being illuminated by the light source;
 capturing a second set of images, with the second image sensor, of a second region of the object, the second region being illuminated by the light source;
 wherein the first image sensor and the second image sensor capture an overlapping region on the object, the overlapping region comprising a part of the first region of the object and a part of the second region of the object;
 projecting a laser light onto the overlapping region on the object, by the laser, wherein the projected laser light has a shape of a cross on the object;
 capturing a third set of images, with the first image sensor, of the object including the projected laser light on the overlapping region;
 capturing a fourth set of images, with the second image sensor, of the object including the projected laser light on the overlapping region; and
 wherein the first image sensor comprises a red (R), a green (G) and a blue (B) color channel, and wherein the wavelength of the laser light is selected so that the green (G) and the blue (B) color channels, or the green (G) and the red (R) color channels, capture the third set of images of the object including the projected laser light on the overlapping region.

* * * * *